March 7, 1967 G. H. WOOLLEY ETAL 3,307,379

MEN'S HOSE OR HALF HOSE OR OTHER KNITWEAR ARTICLES

Filed Nov. 21, 1962 6 Sheets-Sheet 1

United States Patent Office 3,307,379
Patented Mar. 7, 1967

3,307,379
MEN'S HOSE OR HALF HOSE OR OTHER KNITWEAR ARTICLES
George Henry Woolley, Shepshed, and Harry Adams, Mount Sorrell, England, assignors to Whyte & Smith Limited
Filed Nov. 21, 1962, Ser. No. 239,256
Claims priority, application Great Britain, Mar. 30, 1962, 12,218/62
5 Claims. (Cl. 66—178)

This invention is for improvements in or relating to knitwear articles and primarily half hose.

Half hose whether colour patterned or otherwise are usually made mainly of natural fibre yarn such as wool or cotton or of a man-made fibre yarn such as nylon or other synthetic fibre yarn.

Where for example half hose are made mainly of nylon, this renders them harder wearing but tends to detract from warmth and comfort and there is substantially no absorption of perspiration; therefore persons desiring greater warmth and comfort than is given by nylon, and those who prefer not to have nylon in contact with the skin, are in effect usually debarred from their half hose having the hard wearing properties attributed to nylon.

An object of the invention is to provide knitwear articles and primarily half hose of such improved construction that they provide a required degree of warmth and comfort, and also have hard wearing properties of nylon without the nylon being next to the skin.

The invention provides a knitwear article and primarily half hose, composed in the main of double walled knitted fabric whereof the two walls are interconnected along spaced wales in producing a cellular formation, and wherein the walls are knitted substantially throughout of respectively different yarns. The yarn of one wall may be man-made fibre yarn and that of the other wall natural fibre. As applied to half those, the calf, sole and instep are conveniently made of said double walled or cellular knitted fabric whereof the inner wall is conveniently knitted of natural fibre yarn, and the outer wall is conveniently knitted of man-made fibre yarn, which may be of stretch or bulked type. At the interconnections along the spaced wales there may be an interchange of knitted loops from each wall to the other, or the knitted loops in the outer wall may remain there with knitted loops from the inner wall intermeshing with them (which produces a mock rib effect) or the knitted loops in the inner wall may remain there with knitted loops of the outer wall intermeshing with them (which produces a true rib effect).

The yarns may be of different colours or shades, including for example black, white, grey, or neutral whereby a pin-striped effect is obtained, or the yarns may be of the same or similar colours including for example white and neutral or black and grey, in which event a uniform colour or shade effect is obtained. Blended colour yarns may be used.

The invention also provides, in a method of producing half hose, the operations of forming a rib top, followed by production of double walled cellular fabric by two sets of needles at two knitting stations after introducing individual needle control means causing spaced needles selected from needles knitting at one station to knit at the other station until the heel is reached, whereupon production of the double walled cellular fabric is interrupted, and the individual needle control means is rendered inoperative for the heel, this being followed by production of the double walled cellular fabric for the sole and instep after introducing the individual needle control means until the toe is reached, whereupon production of the double walled cellular fabric is interrupted, and the individual needle control means is rendered inoperative for the toe. A splicing thread may be introduced leading to and following the heel.

The above and other features of the invention set out in the appended claims are incorporated in the arrangements, which will be hereinafter particularly described as specific embodiments with reference to the accompanying drawings, in which:

Figure 1:
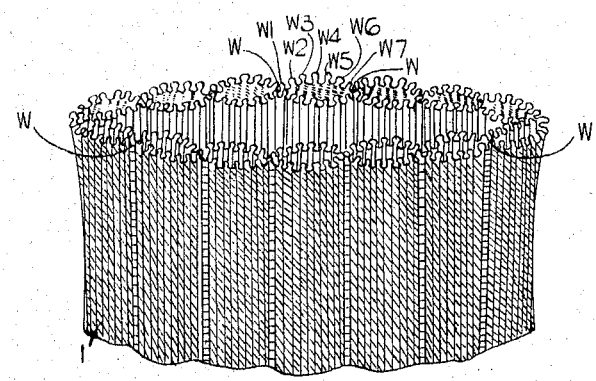
FIGURE 1 is a diagrammatic perspective view illustrating a double walled cellular part of an article of knitwear according to the invention.

Referring to FIGURE 1 a knitwear article is provided which is at least in part of double walled or cellular construction and is of tubular form.

The outer tube or wall 1 is knitted, in this example, of man-made fibre yarn say nylon stretch or bulk yarn, and the inner tube or wall 2 is knitted in this example of natural fibre yarn say wool. Hereinafter for the sake of convenience the yarns will be referred to as nylon and wool.

The two walls 1, 2 are interconnected along widely spaced wales W, e.g. with groups of say seven wales W1–W7 between, in this example, spaced single wales, or more if desired.

Figure 2:
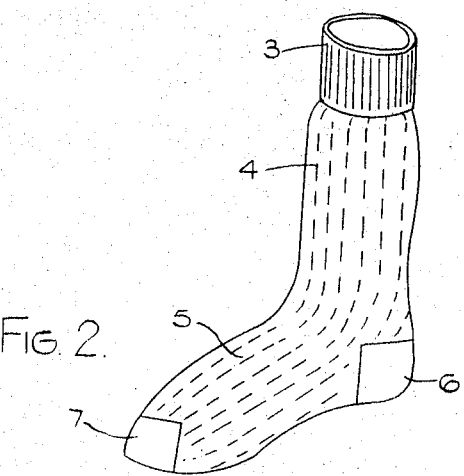
FIGURE 2 is a side view of a knitwear article according to the invention.

As represented in FIGURE 2, half hose comprising a rib welt 3, calf 4, sole and instep 5, heel 6, and toe 7, may have the calf 4 and sole and instep 5 made of the double walled or cellular fabric with the wall of nylon, for hard wearing, outermost so that in use the nylon will not be next to the skin and the wool wall innermost for warmth and comfort.

The two yarns may be of different colours as hereinbefore referred to. For example the nylon may be black and the wool white such that the outer appearance is generally black with thin white stripes, or there may be thin black stripes at the inner side.

Alternatively the yarns may be of the same colour as hereinbefore referred to. For example the yarns may be black giving a general all-over black appearance. In other examples blended colour yarns may be used.

The interconnections may be in form of interchange of knitted loops from each wall in which they would normally appear to the other, such that there are thin stripes at the outer side and at the inner side.

Alternatively knitted loops of only one wall in which they would normally appear may be taken in the other wall.

Figure 4:
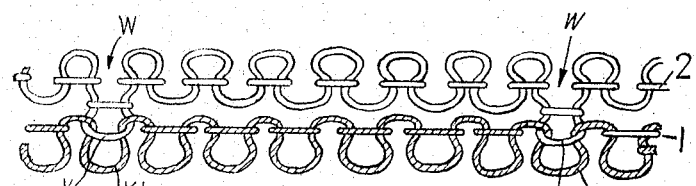
FIGURE 4 is a sectional view of part of said fabric.
Figure 3:
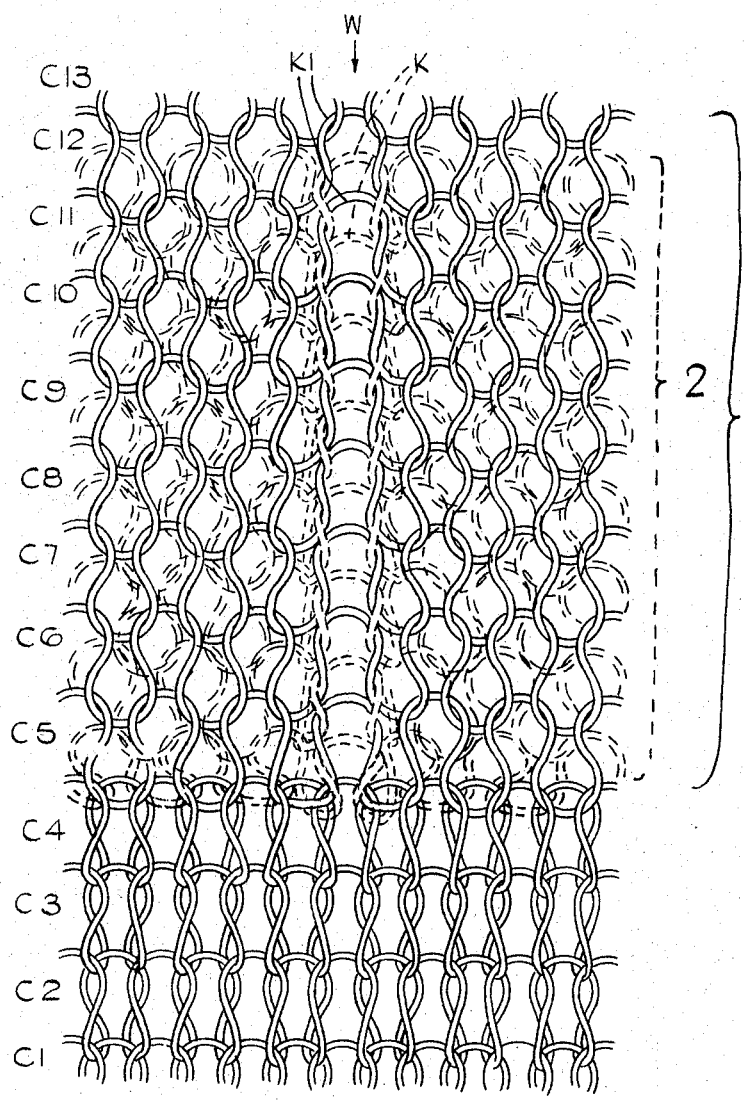
FIGURE 3 is an enlarged fabric face view of part of said article.

This alternative is illustrated in FIGURES 1, 3 and 4 in respect of knitted loops of the inner wall appearing in the outer wall, although it is to be understood that loops from the outer wall may be taken in the inner wall. Referring to FIGURE 3 the lower four courses C1–C4 are first produced of 1 x 1 rib fabric as for example for the welt 3 of half hose. The remaining courses C5–C13 then produced from the double walled or cellular fabric as for example for the calf 4 and later for the sole and instep 5.

Figure 8:
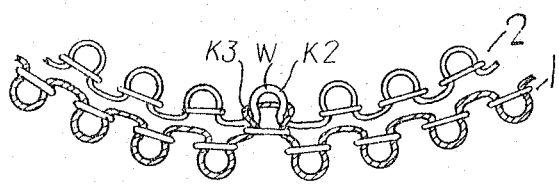
FIGURE 8 is a similar view to FIGURE 4 showing the modification.

In each course C5–C13 the outer and inner walls 1, 2 are interconnected at the spaced one or more wales, such as exemplified by the single wale, by knitted loops K of yarn which would normally be in the inner wall but which instead are in the outer wall 1 interspersed with loops K1 of the latter wall such that they are hardly noticeable among all the other loops of the outer wall. See FIG. 4 which shows a cross section of the fabric where loops K1 of the outer wall 1 have been formed following formation of loops K from yarn of the inner wall. In practice the tendency is for the wales such as W to give a mock rib appearance to the outer side of double walled or cellular fabric as seen in FIGURE 1. In the alternative instance where loops of yarn of the outer wall are taken in the inner wall, this gives a true rib effect at the outer side, as shown in FIGURE 8 which shows a cross-section of the fabric where loops K2 of the inner wall 2 have been formed following formation of loops K3 of yarn of the outer wall 1.

In a method of knitting the half hose of FIGURE 2 on a superimposed cylinder knitting machine, the 1 x 1 rib top is produced (following usual linking, welt and draw thread courses) by feeding nylon stretch or bulk yarn NY (FIGURE 5) from a yarn feeder No. 7 at a "back" knitting station KS to two sets of needles TN, BN co-operating in 1 x 1 relationship (and travelling from right to left in FIGURE 5), and feeding a nylon stretch or bulk yarn NY1 from a yarn feeder No. 5 at a "front" knitting station KS1 to the sets of needles TN, BN. An elastic yarn may be incorporated in known manner.

When the rib top is complete, a top stitch bolt cam TBC is withdrawn so that the top set of needles TN miss the nylon yarn NY which is therefore only knitted by the bottom set of needles BN to produce a wall of non-rib nylon fabric at the outer side of the sock. At the "front" knitting station KS1 the previously active nylon feeder No. 5 is withdrawn and a feeder No. 3 for feeding a wool yarn WY is introduced. However a bottom stitch bolt cam BBC is withdrawn so that the bottom set of needles BN miss this wool yarn WY at the "front" knitting station KS1, and the wool yarn WY is knitted by the top set of needles TN at the "front" knitting station to produce a wall of wool fabric at the inner side of the sock.

In addition, when the rib top was completed, a jack patterning system JS was rendered effective to act on special butts B associated with single, or a small number, of the bottom set of needles BN, which are spaced by groups of the top set of needles TN (say seven in a group for example). These spaced needles BN1 of the bottom set are selected by the jack patterning system JS to enter the "front" knitting station KS1 at knitting level so that they knit the wool yarn WY thereby to attach the two walls of fabric together at circumferentially spaced wales.

This arrangement continues throughout production of the calf 4 to the heel 6.

The machine is next prepared for reciprocation in production of the heel 6 in usual manner, the wool yarn feeder No. 3, the nylon yarn feeder No. 7, the "back" knitting system and the jack patterning system JS being rendered ineffective, and nylon yarn feeder No. 4 being introduced for knitting of the heel in usual manner at the "front" knitting station KS1.

The heel 6 is terminated by reverting to circular motion in usual manner (withdrawing feeder No. 4 and reintroducing feeders No. 3 and 7), during which the needles are operated for the sole and instep 5 as for the calf 4.

When the toe is reached, the machine again reciprocates in usual manner, all feeders except No. 4 being out, the "back" knitting system being again ineffective, and the jack patterning system JS also being rendered ineffective.

By virtue of the use of stretch or bulk nylon yarn the sock is of stretch type, and the stitch quality of the knitting is such that the inner wall of wool fabric is contracted by the outer wall of stretch fabric when the sock is not in use, and is expanded with the outer wall when the sock is in use.

Figure 7:
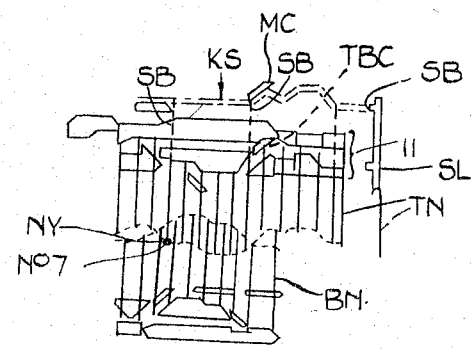
FIGURE 7 is a similar view to FIGURE 6 showing a modification.

Various modifications may be made without departing from the invention: for example the wool may be replaced by say cotton, and the nylon may be replaced say by Terylene. Instead of spaced needles of the bottom set being selected, corresponding needles of the top set may be caused to knit the nylon yarn at the back knitting station for the modification of FIGURE 8. Conveniently, as shown in FIGURE 7, a movable cam MC is rendered operative, and the sliders such as at SL which are associated with the spaced needles to be selected have special butts SB whereby the selected spaced needles are caused to knit the nylon yarn NY at the knitting station KS.

Figure 9:
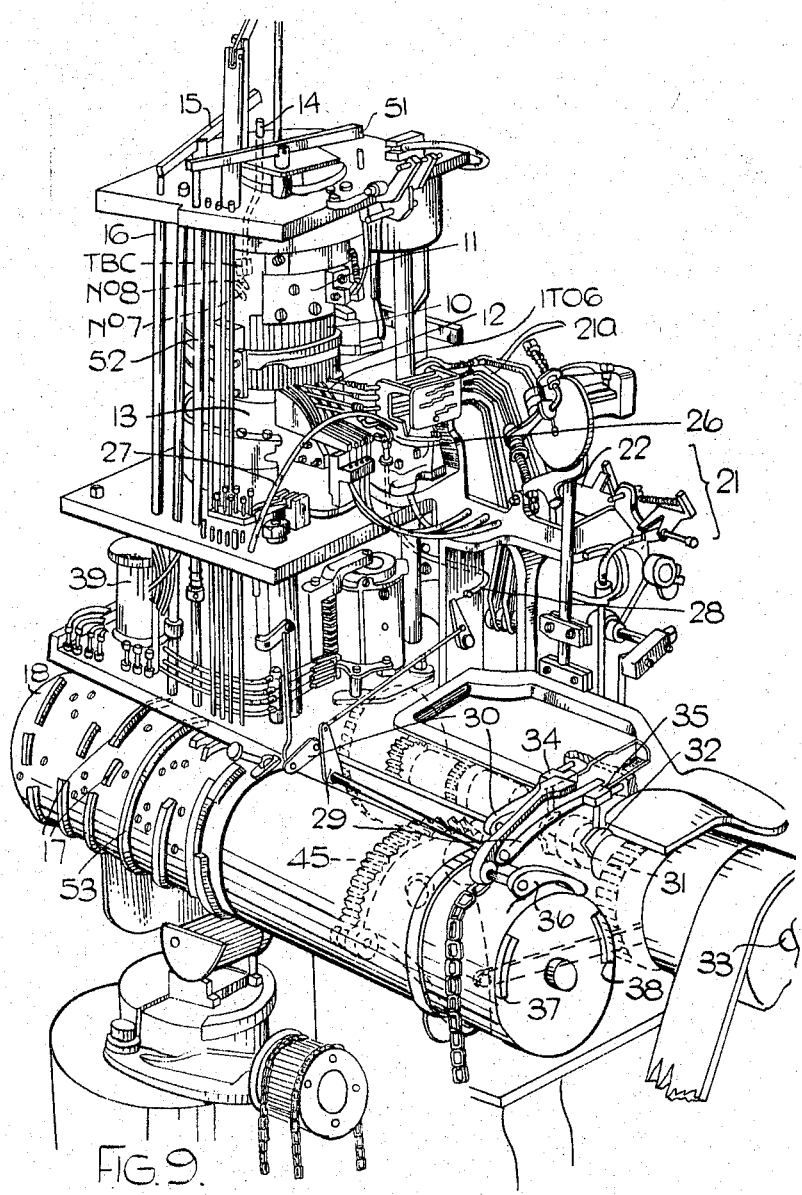
FIGURE 9 is a general perspective view of the superimposed cylinder knitting machine.
Figure 10:
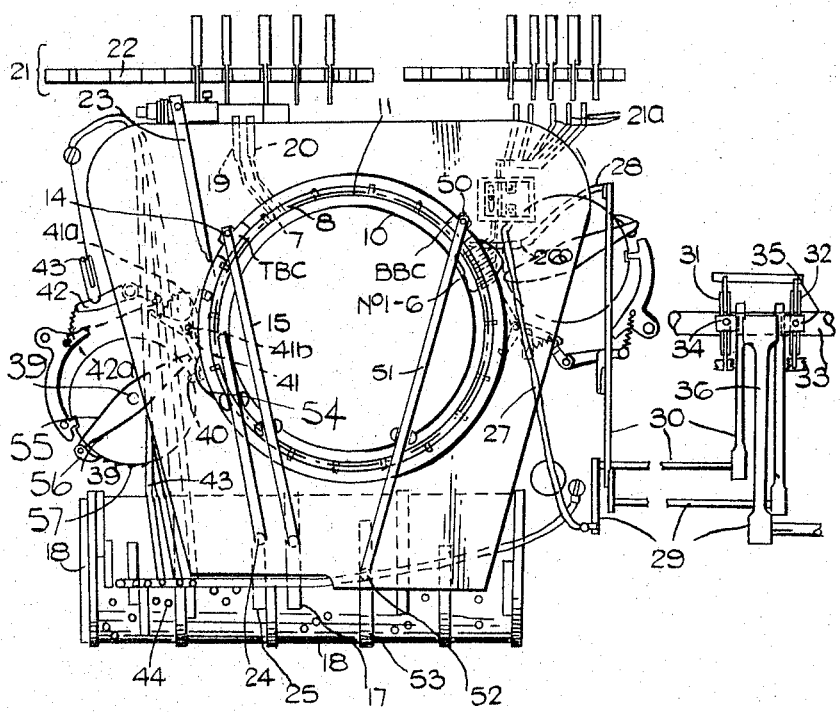
FIGURE 10 is a somewhat diagrammatic plan view of said machine.
Figure 11:
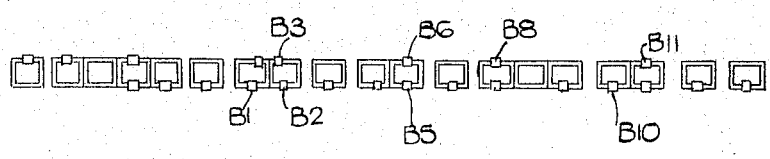
FIGURE 11 is a diagram of part of the machine's pattern chain.

A superimposed cylinder knitting machine of the Komet KL type is suitable for carrying out the method of producing a sock as above, and relevant parts of this machine are shown in FIGURES 9, 10 and 11 it being understood that these parts and other parts of the machine are well known to those skilled in the art.

Figure 5:
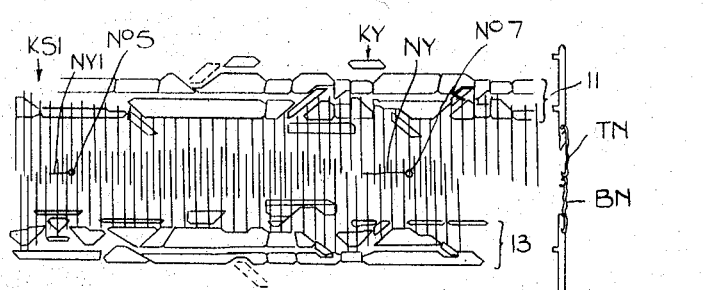
FIGURE 5 is a view of the cam layout of cams of a superimposed cylinder knitting machine for producing said article as seen from outside the cam cylinder wherein the needles which pass in back are shown in full line.
Figure 6:
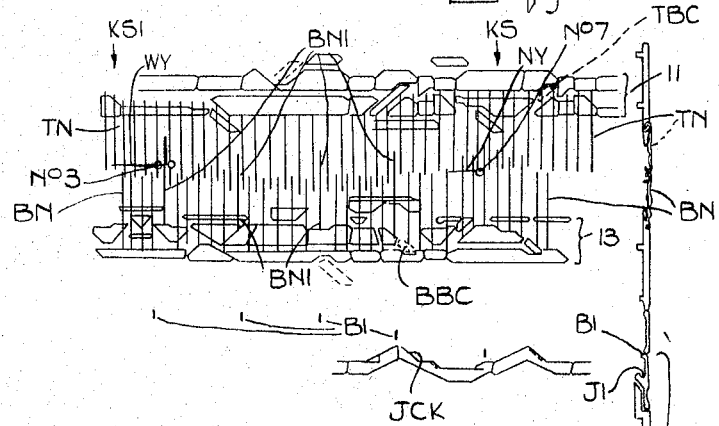
FIG. 6 is a similar view to FIG. 5 at a later stage in the production of the articles still showing the needles which pass in the back in full line.

In the machine, FIGURE 9, the top needle cylinder 10 is surrounded by the top needle cams 11 (as set out in FIGURES 5 and 6) and the bottom needle cylinder 12 is surrounded by the bottom needle cams 13 (as set out in FIGURES 5 and 6). The top bolt cam TBC is shown in broken lines, as are the "back" nylon feeder No. 7 and draw thread feeder No. 8. The top bolt cam TBC is withdrawn (for the fabric of FIGURE 4) when required by a plunger attachment 14 operated by a lever 15 which is acted on by a rod 16 from suitable cam bits 17 on the control drum 18 which is racked around in usual manner.

The "back" feeders No. 7 and No. 8 are introduced and withdrawn at required times through plunger connections 19, 20 (FIGURE 10) to feeder selecting mechanism 21 of usual form including a gated bar 22 which is endwise displaceable in usual manner and is pivotally displaced through a lever 23 and a rod 24 operating it from cam bits 25 on the drum 18. The bottom bolt cam BBC is withdrawn when required by a plunger attachment operated by a lever 51 which is acted on by a rod 52 from suitable cam bits 53 on the control drum 18.

"Front" feeders Nos. 1–6 are introduced and withdrawn in usual manner through levers 21a from the feeder selecting mechanism 21, at the times required in the production of the sock.

The aforesaid jack patterning system JS includes the usual selecting drum 39, which in the present instance is used only for selection of the spaced bottom needles BN1. For this purpose the drum 39 is stationary and it has a column of pegs at 40 (FIGURE 10) for all except one (or a small number, if more needles are to be selected) of selector levers 41. Tail parts 41a of these levers are adjacent the bottom needle cylinder 12 and tail parts 41b are behind a post part 42a of a lever device 42 which is operable by Bowden cable mechanism 43 from cam bits 44 on the drum 18. The particuar jacks J (FIGURES 5 and 6) under the spaced bottom needles BN1 each have a butt b at the level of the selector lever 41 not having a controlling associated peg.

Normally all the selector levers 41 are held by the lever device 42 inoperative clear of the drum 39 and needle cylinder 12. When the rib top 3 of the sock is completed the lever device 42 is operated by the mechanism 43, 44 to allow springs 41b to urge the selector levers 41 into co-operation with the drum 39 and cylinder 12. However where there are pegs in the drum 39 these will prevent their associated selector levers 41 from becoming effective, while the single selector lever 41 (or others as required) without an associated peg becomes effective and its tail part 41a acts on the spaced jack butts B in turn (as they move round with the needle cylinder) to cause a butt B1 of an intermediate jack J1 (of rocking type) to engage with a jack cam track JCK, FIGURES 5 and 6. As a result of this the spaced needles are raised by these jacks to a level at which they will knit the wool yarn WY at the "front" knitting station KSI in the required manner.

The machine is operated to change to reciprocatory motion for the heel and toe in known manner by clutch control of a quadrant gear 45, FIGURE 9.

Timing of the various operations is effected from the usual pattern chain, FIGURE 11, which includes operating bits at appropriate positions for racking of the drum 18 at required times; specifically the drum is racked (by usual means) for the various special operations by bits as follows: bit B1 for withdrawing the bottom bolt cam BBC; bit B2 for withdrawing top bolt cam TBC; bit B3 for withdrawing the nylon feeder No. 5 and introducing the wool feeder No. 3; bit B5 for withdrawing nylon feeder No. 7 and splicing feeder No. 1; bit B6 for taking wool feeder 3 out and moving nylon feeder No. 4 in; bit B8 for re-introducing wool feeder No. 3 and taking out nylon feeder No. 4; bit B10 for taking out nylon feeder No. 7; and bit B11 for taking out wool feeder No. 33 and re-introducing nylon feeder No. 4.

For the alternative of the spaced needles to be selected being in the top set of needles, the movable cam MC may be controlled in a manner and by means similar to the manner and means of controlling the stitch bolt cams TBC and BBC.

What we claim is:

1. A stocking having a foot, leg, heel and toe portion, said foot and leg portion being formed from a circular knitted fabric comprising an inner tube of courses and wales of knitted loops substantially all composed of a yarn of a soft fiber and an outer tube of courses and wales disposed closely about said inner tube and substantially all composed of a yarn of hard wearing fiber, a plurality of means spaced about the circumference of said fabric interconnecting said inner tube and said outer tube, each of said means extending throughout the length of said fabric and containing a portion of the single loops of yarn of one of said tubes looped through a portion of the single loops of yarn of the other of said tubes, each of said interconnecting means forming a plurality of enclosed cells from the loops of said inner and outer tubes, said cells extending throughout the length of said fabric in a continuous ornamental pattern, said tubes being otherwise free of each other between said cells.

2. The stocking of claim 1 wherein said hardwearing yarn is nylon and said soft yarn is wool.

3. The stocking of claim 1 wherein said means are uniformly spaced in parallel relationship about the circumference of said stocking.

4. The stocking of claim 1 wherein the portion of loops of the inner tube which form said cells appear in the outer tube.

5. The stocking of claim 1 wherein the portion of loops of the outer tube which form said cells appear in the inner tube.

References Cited by the Examiner

UNITED STATES PATENTS

| 338,341 | 3/1886 | Dodge | 66—188 |
|---|---|---|---|
| 1,018,134 | 2/1912 | Scott | 66—196 X |
| 1,601,020 | 9/1926 | Holden et al. | 66—178 |
| 1,813,266 | 7/1931 | Woods | 66—182 X |
| 2,166,166 | 7/1939 | Larkin | 66—170 |
| 2,263,763 | 11/1941 | Edwards | 66—178 |
| 2,372,497 | 3/1945 | Johnson et al. | 66—196 X |
| 2,714,813 | 8/1955 | Hill | 66—188 X |
| 2,879,654 | 3/1959 | Evans | 66—196 X |
| 2,892,330 | 6/1959 | Klahr et al. | 66—14 |
| 2,934,923 | 5/1960 | Elwell | 66—188 |
| 2,987,898 | 6/1961 | Ferraguti | 66—14 |
| 3,015,943 | 1/1962 | Loizillon | 66—188 |
| 3,107,510 | 10/1963 | Manger | 66—196 X |

FOREIGN PATENTS

| 9,038 | 8/1928 | Australia. |
|---|---|---|
| 349,728 | 6/1931 | Great Britain. |
| 782,438 | 9/1957 | Great Britain. |
| 841,309 | 7/1960 | Great Britain. |

MERVIN STEIN, *Primary Examiner.*

DONALD W. PARKER, *Examiner.*

W. C. REYNOLDS, *Assistant Examiner.*